United States Patent
Varnell

(10) Patent No.: US 10,613,449 B2
(45) Date of Patent: *Apr. 7, 2020

(54) COMPOSITIONS AND METHODS FOR TREATING A SUBSTRATE AND FOR IMPROVING ADHESION OF AN IMAGE TO A TREATED SUBSTRATE

(71) Applicant: SOLENIS TECHNOLOGIES, L.P., Wilmington, DE (US)

(72) Inventor: Daniel F. Varnell, Wilmington, DE (US)

(73) Assignee: SOLENIS TECHNOLOGIES, L.P., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/940,659

(22) Filed: Mar. 29, 2018

(65) Prior Publication Data

US 2019/0302636 A1 Oct. 3, 2019

(51) Int. Cl.

| | | |
|---|---|---|
| *G03G 7/00* | (2006.01) | |
| *G03G 13/10* | (2006.01) | |
| *G03G 11/00* | (2006.01) | |
| *C08L 39/04* | (2006.01) | |
| *C08L 9/06* | (2006.01) | |
| *C08K 3/16* | (2006.01) | |
| *C08K 3/22* | (2006.01) | |
| *C08L 33/26* | (2006.01) | |

(52) U.S. Cl.
CPC ............. *G03G 7/0066* (2013.01); *C08K 3/16* (2013.01); *C08K 3/22* (2013.01); *C08L 9/06* (2013.01); *C08L 33/26* (2013.01); *C08L 39/04* (2013.01); *G03G 7/004* (2013.01); *G03G 7/008* (2013.01); *G03G 7/0013* (2013.01); *G03G 7/0026* (2013.01); *G03G 7/0093* (2013.01); *G03G 11/00* (2013.01); *G03G 13/10* (2013.01); *C08K 2003/164* (2013.01); *C08K 2003/2227* (2013.01)

(58) Field of Classification Search
CPC .... G03G 7/0066; G03G 7/0073; G03G 7/008; G03G 7/0093; G03G 7/0013; G03G 7/0033; G03G 13/10; G03G 15/14; G03G 7/0026; G03G 7/004; G03G 15/10; C09D 133/24; C09D 133/26; D21H 17/00; D21H 19/12; B41M 5/00

USPC .......................................................... 430/18
See application file for complete search history.

(56) References Cited

U.S. PATENT DOCUMENTS

| | | | |
|---|---|---|---|
| 6,162,328 A | 12/2000 | Cenisio et al. | |
| 8,491,975 B2* | 7/2013 | Liao ...................... | B41M 5/506 427/243 |
| 8,795,818 B2* | 8/2014 | Wang ...................... | B41M 5/52 428/206 |
| 9,034,953 B2* | 5/2015 | Zhou .................... | B41M 5/0035 106/156.23 |
| 2005/0222353 A1* | 10/2005 | Kopolow ............... | A61K 8/817 526/264 |
| 2010/0260939 A1 | 10/2010 | Foley | |
| 2016/0282737 A1* | 9/2016 | Hood .................... | C08F 226/06 |
| 2017/0335115 A1* | 11/2017 | Seshadri ............ | C08G 18/0809 |
| 2017/0336725 A1 | 11/2017 | Varnell | |
| 2018/0335711 A1 | 11/2018 | Varnell | |

FOREIGN PATENT DOCUMENTS

| | | |
|---|---|---|
| WO | 2017097371 A1 | 6/2017 |
| WO | 2019070671 A1 | 4/2019 |

OTHER PUBLICATIONS

ISA-USPTO, International Search Report and Written Opinion issued in International Application No. PCT/US2019/024367, dated Jun. 21, 2019.

\* cited by examiner

*Primary Examiner* — Janis L Dote
(74) *Attorney, Agent, or Firm* — Lorenz & Kopf, LLP

(57) ABSTRACT

A method for treating a substrate is provided herein. The method includes providing a substrate and applying a composition to the substrate to form the treated substrate. The composition includes a binder, a binder additive, and an aluminum salt. A method for improving adhesion of an image to the treated substrate is also provided herein. The method includes providing the substrate, applying the composition to the substrate to form the treated substrate, and applying a liquid toner to the treated substrate to form the image on the treated substrate. A printed material exhibiting improved adhesion of the image to the treated substrate is also provided herein. The printed material includes a treated substrate. The treated substrate includes the substrate and a coating disposed on the substrate and formed from the composition. The printed material further includes the image disposed on the treated substrate and formed from the liquid toner.

18 Claims, No Drawings

COMPOSITIONS AND METHODS FOR TREATING A SUBSTRATE AND FOR IMPROVING ADHESION OF AN IMAGE TO A TREATED SUBSTRATE

TECHNICAL FIELD

The present disclosure generally relates to compositions and methods for treating a substrate and for improving adhesion of an image to a treated substrate and more particularly relates to systems and methods utilizing an aluminum salt for treating a substrate and for improving adhesion of an image to a treated substrate.

BACKGROUND

Liquid electrophotographic (LEP) printing uses a liquid ink for printing on substrates rather than using a dry, powder toner. Common examples of LEP printing machines are the HP® digital Indigo™ printing presses. The toner particles in the liquid ink used in LEP printing are sufficiently small such that the LEP-printed images do not mask the underlying surface roughness/gloss of, for example, paper substrates. The liquid ink (also referred to herein as "ink", "liquid toner", or "LEP ink") used in LEP printing is a suspension of small pigment particles in the range of about 1 to 2 microns in a nonaqueous liquid. HP® ElectroInk® is a commonly used liquid ink for liquid electrophotographic printing. LEP printing is considered to give some of the best digital print quality images at a relatively rapid speed.

However, it has been found that LEP printed images will not adhere to substrates as well as images printed using electroreprographic printing methods that utilize a dry-toner process. While conventional compositions have been applied to substrates to attempt to improve adhesion of the image formed from liquid toner, further improvements are necessary due to (1) inconsistencies in adhesion performance depending on the grade of paper utilized as the substrate and (2) the difficulty in obtaining a near perfect (100%) adhesion of images printed from LEP printing as tested by HP® standard procedures, regardless of the grade of paper.

Accordingly, it is desirable to provide systems and methods for treating a substrate and for improving adhesion of an image to a treated substrate. Furthermore, other desirable features and characteristics will become apparent from the subsequent summary and detailed description and the appended claims, taken in conjunction with the accompanying drawings and the foregoing technical field and background.

BRIEF SUMMARY

Various non-limiting embodiments of compositions for treating a substrate and for improving adhesion of an image to a treated substrate, and various non-limiting embodiments of systems and methods for the same, are disclosed herein.

In a non-limiting embodiment, a method for treating a substrate is provided herein. The method includes, but is not limited to, providing a substrate. The method further includes, but is not limited to, applying a composition to the substrate to form the treated substrate. The composition includes, but is not limited to, a binder, a binder additive, and an aluminum salt.

In another non-limiting embodiment, a method for improving adhesion of an image to the treated substrate is provided herein. The method includes, but is not limited to, providing the substrate. The method further includes, but is not limited to, applying the composition to the substrate to form the treated substrate. The method further includes, but is not limited to, applying a liquid toner to the treated substrate to form the image on the treated substrate.

In another non-limiting embodiment, a printed material exhibiting improved adhesion of the image to the treated substrate is provided herein. The printed material includes, but is not limited to, a treated substrate. The treated substrate includes, but is not limited to, the substrate and a coating disposed on the substrate and formed from the composition. The printed material further includes, but is not limited to, the image disposed on the treated substrate and formed from the liquid toner.

DETAILED DESCRIPTION

The following detailed description is merely exemplary in nature and is not intended to limit the systems and methods as described herein. Furthermore, there is no intention to be bound by any theory presented in the preceding background or the following detailed description.

Compositions and methods for treating a substrate and/or improving adhesion of a liquid toner to the substrate are provided herein. In embodiments, a method for improving adhesion of an image formed from the liquid toner utilizing liquid electrophotographic printing (LEP printing) is provided herein. As used herein, "liquid electrophotographic printing" can be used interchangeably with "LEP printing", "electroreprographic printing with liquid toner particles", or "xerographic printing with liquid toner particles"; all of which encompass, for example, HP® digital INDIGO™ printing presses and processes. Further, as used herein, liquid electrophotographic printing does not refer to or encompass the offset type printing process known as lithography and discussed in more detail in Alex Glassman, Printing Fundamentals, TAPPI Press, 1985, which is hereby incorporated herein in its entirety.

The composition for improving adhesion of the liquid toner to the substrate includes a binder, a binder additive, and an aluminum salt. The composition is water-based. The method for improving adhesion of an image to a treated substrate includes the steps of providing the substrate, applying the composition to the substrate to form the treated substrate, and applying the liquid toner to the treated substrate to form the image on the treated substrate. In embodiments, the liquid toner includes a suspension of pigment or pigment-containing particles in a non-aqueous liquid. The liquid toner is applied to the treated substrate utilizing liquid electrophotographic printing.

In some embodiments, the binder includes a water-soluble hydroxyl-functional polymer. The binder may include a polyvinyl alcohol, a starch e.g., an oxidized starch, a cationized starch, an ethylated starch, an esterified starch, and an enzymatically denatured starch), a gelatin, a casein, a protein (e.g., a soybean protein), a carboxy-methyl cellulose, a hydroxyethyl cellulose, an acrylic emulsion, a vinyl acetate emulsion, a vinylidene chloride emulsion, a polyester emulsion, a styrene-butadiene emulsion, an acrylonitrile-butadiene latex, or combinations thereof. It is to be appreciated that any binder known in the art for treating substrate may be utilized so long as the binder is appropriate for the application method used to apply the treatment. In certain embodiments, the binder includes a starch and the starch may be selected from the group of an oxidized starch, a cationized starch, an ethylated starch, an esterified starch, an enzymatically denatured starch, and combinations thereof.

The composition may include the binder in an amount of from about 3 to about 50 wt. %, alternatively from about 3 to about 18 wt. %, or alternatively from about 6 to about 18 wt. %, or alternatively from about 6 to 12 wt. % based on a total weight of the composition. However, what is more important is that the viscosity of the composition is suitable for application by the method selected and that it provides the level of application of the composition that is desired. Furthermore, the ratio of the binder, binder additive, and aluminum salt are more important than the individual concentration of any one of the components. The ratios are listed below.

The binder additive may include a polymer (hereinafter referred to as "binder additive polymer") with the binder additive polymer including at least one repeating unit. Unless otherwise specified herein, the term "polymer", as utilized herein, refers to a polymer including one or more different monomeric units, which can encompass, for example, copolymers and terpolymers. In embodiments, the repeating unit has a localized strong, negatively charged dipole (such as a carbonyl group) and no strongly positively charged dipole. As used herein, "localized strong, negatively charged dipole" means there is in the structure of the repeating unit a functional group such as a carboxyl group and herein "strong" is defined as having a local dipole moment of great than 2 dynes, where a carbonyl group is known to have a dipole of about 2.4 dynes in magnitude, the local dipole arising from differences in electronegativity of atoms bound together. Herein, having "no strongly positively charged dipole means there is no localized dipole (such as from a hydroxyl group) that has a dipole greater than 0.8 dynes in magnitude. The repeating unit may include, but is not limited to, a carbonyl group.

In embodiments, the at least one repeating unit includes a tertiary amide group. At least one of the carbon atoms bonded to the nitrogen atom of the tertiary amide group may have two or three hydrogen atoms bonded thereto, and the carbonyl group of the tertiary amide group may be bonded to a —CH, —CH2, or —CH3 group. In certain embodiments, the at least one repeating unit of the binder additive polymer is formed from a monomer selected from the group of vinylpyrrolidone, an oxazoline-containing monomer, N-vinyl piperidinone, N-vinylcaprolactam, N,N-dimethyl acrylamide, and combinations thereof. In exemplary embodiments, the at least one repeating unit of the binder additive polymer is formed from a monomer selected from the group of 2-ethyl-2-oxazoline, 2-methyl-2-oxazoline, and a combination thereof.

The binder additive polymer may be a homopolymer. In certain embodiments, the binder additive may include poly (2-ethyl-2-oxazoline), poly(2-methyl-2-oxazoline), or a combination thereof. In other embodiments, the binder additive may include polyvinylpyrrolidone.

The binder additive polymer may be additionally formed from one or more non-ionic monomers. For example, the binder additive polymer may be formed from (i) one or more monomers selected from the group of vinylpyrrolidone, an oxazoline-containing monomer, N-vinyl piperidinone, N-vinylcaprolactam, N,N-dimethyl acrylamide, or combinations thereof and (ii) one or more non-ionic monomers. The terminology "non-ionic monomer," as utilized herein, is one that does not have an anionic or cationic functionality under the conditions of use. Examples of monomers having an anionic or cationic functionality under the conditions of use include, but are not limited to, an acrylic acid, methacrylic acid, and quaternary amine-containing monomers.

The binder additive polymer may be additionally formed from one or more monomers that do not strongly lead to hydrogen bonding with the itself, either with itself in the same polymer chain or with its self to another polymer chain of the binder additive. In other words, the binder additive may be substantially free of monomers that are capable of leading to a strong degree of self-association of the binder additive polymers. The terminology "substantially free," as utilized herein with regard to the monomers that are capable of leading to a strong degree of self-association, means that the binder additive polymer is formed from less than 1 wt. % of monomers that, when polymerized, are capable of leading to a strong degree of self-association. The terminology "strong degree of self-association," as utilized herein means significant hydrogen bonding of the binder additive polymer with itself or a high degree of dipole-dipole interactions of the binder additive polymer with itself. For a discussion of interactions between monomer units in a polymer, and one polymer with another polymer or with a solvent, refer to Chapter 12 of Paul Flory's classic work "Principles of Polymer Chemistry, first published in 1953 by Cornell Press. He defined an interaction parameter that expressed "the first neighbor interaction free energy." Others have expanded greatly on the concept since Flory's work. Those familiar with the concept will recognize that the point being made here is that the polymer additives of this invention have the trait of having little self-association, on a relative basis, versus other polymers and more importantly (although not meaning to be bound by theory), they are polymers that will interact on a molecular level more strongly with the polymer of the liquid toner than with themselves.

The binder additive polymer may be water-dispersible or water soluble. In certain embodiments, the binder additive polymer is water soluble. Water soluble is defined generally as indicating the material is mostly or at least 90% soluble in water at room temperature, although heat may be used to assist getting the polymer into solution. Water soluble can also mean that the polymer can be dissolved to at least a concentration of 5% in water. Water solubility can also be defined as a certain level of hydrophobicity. Solubility also implies that the material is not crosslinked to an extent to prevent the molecular chains from separating in water.

The binder additive polymer may have a number average molecular weight greater than about 40,000 Daltons, alternatively greater than about 80,000 Daltons, alternatively greater than about 190,000 Daltons, or alternatively greater than 450,000 Daltons, wherein the upper boundary is a molecular weight that would prevent the formation of a solution including the binder additive polymer, as would be recognized by a person of ordinary skill in the art.

The composition may include the binder additive polymer in an amount of from about 0.01 to about 20 wt. %, alternatively from about 0.1 to about 20 wt. %, or alternatively from about 0.1 to about 6 wt. %, or alternatively from about 0.3 to 6 wt. %, or alternatively from about 0.3 to 3 wt. % based on a total weight of the composition.

As introduced above, the composition further includes an aluminum salt. It is to be appreciated that the composition may include more than one aluminum salt. The aluminum salt may include, but is not limited to, aluminum sulfate, polyaluminum chlorohydrate, aluminum chlorohydrate, polyaluminum chloride, aluminum chloride, polyaluminum chlorosulfate, sodium aluminate, or combinations thereof. In certain embodiments, the aluminum salt includes polyaluminum chlorohydrate. The basicity of the aluminum salt may be greater than about 35%, alternatively greater than about 50%, or alternatively greater than about 60%. The aluminum salt is water soluble as solubility is defined above.

The inclusion of the aluminum salt in the composition provides unexpected improvements for adhesion of the liquid toner to the substrate as compared to a composition free of the aluminum salt. Without being bound to theory, it is believed that this unexpected improvement is at least in part due to the aluminum salt limiting the distribution of the paper treatment down into the paper structure and thereby rendering an increased amount of the components of the composition toward a surface of the substrate. The role of the aluminum salts is to affect the efficacy of the binder polymer additive and this is the nature of the surprising results, but the aluminum salts on their own do not significantly alter the adhesion of liquid toner images. The mechanism, without being bound by this theory, maybe related to a molecular arrangement of the binder polymer additive or even a localized agglomeration of binder polymer additive that leads to it having increased interactions with the polymer in the liquid toner such as used in HP® INDIGO™ presses.

The composition may include the aluminum salt in an amount of from about 0.01 to about 20 wt. %, alternatively from about 0.1 to about 20 wt. %, or alternatively from about 0.1 to about 6 wt. %, or alternatively from about 0.3 to 6 wt. %, or alternatively from about 0.3 to 3 wt. % based on a total weight of the composition.

The composition comprises the binder additive and the aluminum salt in a weight ratio of from about 4:1 to about 1:2, alternatively from about 3:1 to about 1:2, or alternatively from about 3:1 to about 1:1. It is to be appreciated that the ratio of binder additive to aluminum salt can vary based on the substrate such that each can be separately utilized in the ranges given independent of the other, as described above.

The desired viscosity of the composition will be dependent on the method used for applying the composition to a substrate. It will also be dependent on the concentration of the components of the composition and the desired final level of the composition. In the case of treatment of paper at the size press of a paper machine the composition may have a viscosity of from about 100 cps to about 700 cps, but again this is dependent on the particular size press equipment and other factors such as the speed of the paper machine.

The composition may further include additional additives for improving the adhesion of the liquid toner printed on a substrate via LEP printing. Non-limiting examples of the additional additives include poly(ethylene acrylic acid) and polyethylene imine and polymers based or containing these materials. The amount of carboxylic acid-containing polymer and amount of aluminum salt must be such that the composition remains uniform. It is well known that multivalent salts can coagulate dispersions, especially those with carboxylic acid polymers, and can also precipitate solution of carboxylic acid-containing polymers.

The composition may further include additional additives as known in the art including, but not limited to, fillers, defoamers, waxes, pigments, dyes, paper sizing agents, biocides, rheology modifiers, rosin derivatives, surfactants, solvents, plasticizers, or combinations thereof. Rheology modifiers that can be used can include almost any material known to modify the rheology of a water-based solution such as a cellulosic based thickener like carboxymethyl cellulose or hydrophobically modified hydroxyl ethyl cellulose or alginate based thickeners or starch based thickeners or high molecular weight polymers, pectins, associative thickeners, and the like. The rheology modifier may be solutions or may be a dispersion such as a modified starch, for example Ecosphere materials from Ecosynthetix. Dispersions may act on paper surfaces to block the porous nature of paper and thus hold the active adhesive enhancing additives at the surface of the paper. Rheology of coating and treatment solutions can also be modified by combinations of materials that may form hydrogen bond or ionic complexes. The limitation of rheology modifiers is dictated by the ability of the composition to be applied to a substrate in a consistent manner. For example, there are viscosity limitations for size press compositions to be used on a paper machine size press.

In embodiments, the order of addition of the binder, the binder additive, and the aluminum salt to form the composition, which may be further defined as a size press composition, may impact performance of the composition. To this end, materials may be added one at a time, with mixing, to the binder. For example, one could start with a starch solution, and add to it the binder additive and then separately add the aluminum salt. The materials may be added as water solutions or water based dispersions to aid mixing, shorten mixing time, and reduce occurrences of unfavorable interactions of concentrated solutions.

As introduced above, a method for treating the substrate is provided herein. The method includes the steps of providing the substrate and applying the composition to the substrate to form the treated substrate. In one embodiment the step of applying the composition to the substrate includes the steps of transferring the composition as a water based solution or dispersion or both to the size press of a paper machine where it treats a paper substrate. In another embodiment, the step of applying the composition to the substrate includes the step of providing an applicator roll, applying the composition to the applicator roll, and contacting the substrate and the applicator roll to form the treated substrate. It is to be appreciated that the composition may be applied to the substrate utilizing any suitable method as would be known to a person of ordinary skill in the art so long as the method results in a substantially uniform treatment across the surface of the substrate. Such methods include, for example, but are not limited to, using the size press equipment typically utilized with paper machines, spray coating, foam coating, curtain coating, roller coating, printing, transfer coating from a substrate or combinations thereof.

Treatment of the substrate can be at least a portion of at least one surface of a substrate. Coating may refer to treatment of paper at a size press or some other mechanism as just described. For what the paper industry defines as uncoated paper, size press treatment of the paper is normally referred to as a size press treatment. Coating in the paper industry may refer to the materials and process classically defined in the paper industry for the preparation of "coated paper" and the terminology "coating", as utilized herein, may reference treatments to paper or woven or non-woven substrates that would be referred to as coated paper and may include at least a composition including the binder, the binder additive, and the aluminum salt. It can also include one or more components as would be known by a person of ordinary skill in the art to be beneficial in coating a substrate (e.g., a paper substrate) to enhance the substrate and/or the print quality of an image printed thereon. For example, "coated paper" is typically a paper with a layer of particulate inorganic fillers such as calcium carbonate or clay held on the surface by a binder. Thus, coated paper is a category of paper that has on it fillers held in a "coating" on the surface by a binder. The term is well known in art related to the paper industry and printers. See David Saltman, et al., Pulp & Paper Primer, 2nd Edition, TAPPI Press (1998) at, for example but without limitation, pages 24-25, which is hereby incorporated by reference herein in its entirety.

The substrate may be selected from the group of a paper product, a woven fibrous material, a non-woven fibrous material, and combinations thereof. However, it is to be appreciated that any substrate known in the art compatible with LEP printing may be utilized. Three primary types of substrates printed with LEP printers are well known and include: 1) uncoated paper; 2) coated paper; and polymeric substrates. Uncoated paper and coated paper are well defined terms in the paper industry, although there can be variations on these and other paper surfaces that can be LEP printed. In certain embodiments, the substrate is a paper product, and the paper product is uncoated.

The paper product may be in any orientation as would be known by a person of ordinary skill in the art, such as one or more rolls, cut sheets, and/or various shapes and configurations capable of being printed by a digital LEP printer. The substrate may be uncoated paper, such as that typically used in offices for electroreptrographic printing. The substrate may be coated paper such as used in higher quality printed items. The substrate may be grades of paper used in packaging, and such grades could be uncoated or coated paper. The substrate may be a woven substrate or nonwoven substrate and those may be of cellulosic based materials other natural products or fabricated products. The substrate can also be any other substrate compatible with the LEP printing process as would be known by a person of ordinary skill in the art. However, the formulation for each type of substrate can vary in that the binder may be significantly different. It is significant in how the composition penetrates into the substrate for this will influence the needed levels of binder, polymeric binder additive and aluminum salt, as well as possibly the use of other components such as rheology modifiers. For example, for a very porous substrate the composition may require a higher level of aluminum salt than for a non-porous substrate and the viscosity of the composition may need to be greater.

The nature of the substrate can also affect the step of applying the composition to the substrate. In addition, any treatment of the substrate prior to applying the composition can have an effect on the methods for applying the composition, the amount of the composition, and/or the ratio of the binder additive and aluminum salt. For example, if the substrate is porous, such as for uncoated untreated paper, the composition may soak into the substrate, possibly completely but at least partially, and the amount of the composition may need to be increased as more material soaks into the sheet. That is, the amount of the composition (in particular, the amount of the binder additive and the aluminum salt) applied to a substrate to result in the desired improvement in adhesion may be dependent on the properties of the substrate. Further, the nature of the binder and other additives of the composition, and the viscosity of the composition may also impact the amount of composition that may soak into the substrate. Even with an uncoated paper, a viscous composition may minimally penetrate the paper. For treatment of a nonporous coated substrate, the composition may be part of a coating composition including fillers or pigment particles and the coating composition may be applied to the surface of the paper to form a layer on the substrate. For coated paper, the composition may also be applied to the surface of the paper after the paper has been treated to make it less porous. Regardless of the nature of the substrate, the composition may form an ink-receiving layer to which ink will come in contact with during the printing process and to which the image from the ink may adhere.

The method in which the composition is applied to the substrate can impact the distribution of and the amount of the composition needed to obtain the desired improvement of image adhesion. In embodiments where the composition soaks substantially into the substrate, the amount of the composition applied to the substrate is generally described in terms of weight percent of the substrate. However, for cases, such as non-porous substrates or where the composition remains substantially at the surface of the substrate, such as in embodiments including coated paper where the composition does not soak substantially into the substrate, the amount of composition applied to the substrate is generally described as the amount of composition applied to the surface of the substrate in terms of composition weight per the surface area treated (such as grams per square meter).

In one embodiment, the substrate is a paper product and the amount of binder additive applied to the paper product is in an amount of from about 0.02 to about 1 wt. %, alternatively from about 0.03 to about 0.5%, alternatively from about 0.04 to about 0.25%, or alternatively from about 0.04 to about 0.1% based on a total weight of the paper product on a dry weight basis. Likewise, the amount of aluminum salt on an aluminum oxide basis (not including water complexed with the salt) will be in the same range. To this end, the amount of the aluminum salt applied to the paper product may be in an amount of from about 0.02 to about 1 wt. %, alternatively from about 0.03 to about 0.5%, alternatively from about 0.04 to about 0.25%, or alternatively from about 0.04 to about 0.1% based on a total weight of the paper product on a dry weight basis. However, the ratio of polymeric binder additive to aluminum salt can vary as each can be separately used in the ranges given independent of the other, as described above. The amount of aluminum salt on a basis of aluminum oxide means that the level of aluminum is expressed as the level of aluminum oxide. That is one gram of aluminum would really be 1.92 g of aluminum oxide. This is a common definition in the art for referring the levels of aluminum salts or to the aluminum content of a salt.

In another embodiment, the treated substrate is a paper product, or a nonporous substrate or a substrate for the production of coated paper or a substrate where the application of the treatment remains significantly on the surface of the substrate or where the treated substrate has a first side and a second side opposite the first side, and each of the first side and the second side, independently. Each substrate treated surface includes the binder additive in an amount of from about 0.0075 $g/m^2$ to about 0.375 $g/m^2$, alternatively from 0.0115 $g/m^2$ to about 0.165 $g/m^2$, alternatively from about 0.015 $g/m^2$ to about 0.095 $g/m^2$, or alternatively from about 0.015 $g/m^2$ to about 0.04 $g/m^2$ based on a total weight of the substrate on a dry weight basis. Likewise, the amount of aluminum salt on an aluminum oxide basis, and not including water complexed with the salt, will be in the same range. To this end, each of the first side and the second side may, independently, include the aluminum salt in an amount of from about 0.0075 $g/m^2$ to about 0.375 $g/m^2$, alternatively from 0.0115 $g/m^2$ to about 0.165 $g/m^2$, alternatively from about 0.015 $g/m^2$ to about 0.095 $g/m^2$, or alternatively from about 0.015 $g/m^2$ to about 0.04 $g/m^2$ based on a total weight of the substrate on a dry weight basis. However, the ratio of polymeric binder additive to aluminum salt can vary as each can be separately used in the ranges given independent of the other, as described above.

In embodiments when the composition is applied to the surface of the substrate in the form of a print receiving coating such as known in the art to make a coated paper grade. In one embodiment, the print receiving coating on the substrate includes the binder additive in an amount of from about 0.8 to about 50 wt. %, alternatively from about 1 to about 10 wt. %, or alternatively from about 1 to about 4 wt. % based on a total weight of the print receiving coating. Likewise, the amount of aluminum salt on an aluminum, oxide basis, and not including water complexed with the salt, will be in the same range. To this end, the print receiving coating on the substrate may include the aluminum salt in an amount of from about 0.8 to about 50 wt. %, alternatively from about 1 to about 10 wt. %, or alternatively from about 1 to about 4 wt. % based on a total weight of the print receiving coating. However, the ratio of binder additive to aluminum salt can vary as each can be separately used in the ranges given independent of the other, as described above.

A printed material exhibiting improved adhesion of the image to the treated substrate is also provided herein. The printed material includes the treated substrate and the image disposed on the treated substrate and formed from the liquid toner. The treated substrate includes the substrate and the coating. The coating is disposed on the substrate and formed from the composition.

In embodiments, any image, a 100% black image, or a 290% composite black image (as used for HP® testing) on the printed substrate has an adhesion retention to the treated substrate in an amount of greater than about 80%, alternatively greater than about 85%, alternatively greater than about 90%, or alternatively greater than 95% in accordance with the Tape Pull Test using 3M™ 230 tape, which is described in greater detail below. In one embodiment, the image formed from a 100% black liquid toner has an adhesion retention to the treated substrate reported to be greater than 90% in accordance with the Tape Pull Test as tested by the Rochester Institute of Technology (RIT) using a standard HP® procedure for the HP® INDIGO™ 5500 Press. Currently the test calls for use of 3M™ 234 tape. It replaces the use of 3M™ 230 tape and there is built into the procedure corrections for the change in type of tape. In another embodiment the reported adhesion from RIT is greater than 95%. In another embodiment, the image formed from a 290% black liquid toner has an adhesion retention to the treated substrate reported to be of greater than 80% in accordance or reported to be greater than 90% or reported to be greater than 95% by RIT, per the same HP® tape test.

EXAMPLES

Test Method for Measuring Adhesion

The test method used was the standard method for determining adhesion of HP® digital INDIGO™ printed images to substrates as defined by HP® for qualification of paper for their INDIGO™ presses. More specifically, black rectangle images of 100% black liquid toner were printed using an HP® INDIGO™ 5500 printer in a 4 shot mode using standard temperature settings to provide the test pattern. Black rectangular images were also printed using the same printer and settings, but the black liquid toner was composed of 52 parts yellow, 66 parts magenta, 72 parts cyan, and 100 parts black toner, which are commonly referred to as 290% photo images. The latter test is the more severe test.

Ten minutes after printing the above-described images, the images were tested by RIT, using the standard HP® test and an INDIGO™ 5500 printer, for adhesion to a substrate with a tape test using 3M™ 230 or 234 tape and a weighted roller to uniformly and consistently apply force. The percent of the image not removed by peeling off the tape was measured. Within any example only one of the tapes (either 3M™ 230 or 234 tape) was used and only one standard procedure of HP® was used by RIT. The adhesion values reported in this patent were the adhesion values reported by RIT.

The tests were performed by the Rochester Institute of Technology (the North American test site for qualifying paper treatments for INDIGO™ printing) in compliance with the standard test procedures set forth by HP® for testing the adhesion of ink coated with one of their INDIGO™ printing presses. For these tests, the HP® INDIGO™ press 5500 was used.

Example 1

Exemplary and comparative printed materials were formed and evaluated to determine the effect on LEP print adhesion (image adhesion) of paper additives added to the paper at a size press using a Dixon coater. Dixon coaters are still made today such as shown on the web-site of Emerson & Remwick. They have long been accepted as a means for pilot work on paper surface treatments. The amounts of materials used were adjusted based on the pick-up of starch solutions. The starches used to treat the paper were between 50 and 55° C. at the time of treatment.

A roll of uncoated fine paper suitable for offset or LEP printing was premade. This base paper was made on a commercial paper machine and was made without size press treatment. For the current example the paper had internal sizing from alkyl succinic anhydride and contained about 25% precipitated calcium carbonate filler. The paper was fed through the Dixon coater with a puddle size press mode such that the paper was treated on both sides with a starch solution. In the process, the paper continued to pass through the Dixon coater to be dried and wound on a real. Additives for treating the paper were added to a starch solution. The starch used was ETHYLEX® 2020 from Tate & Lyle. It was batch cooked to dissolve it, and it was applied at a solution concentration of 11.6% to give a final amount of dry starch to final dry paper of 3.0%. For each run the starch contained a hexasulfonate optical brightening agent and sodium chloride. The amount of OBA and NaCl in the final dry paper were 0.5% and 0.3% For the OBA it was 0.5% of the as received OBA product to a dry paper weight. That is the amount of OBA in the paper was 0.5% of the as received OBA solution to dry paper weight. A small amount (0.02% on an as received basis to dry paper weight) of the defoamer product was added to the starch solution. It is common that a small amount of defoamer is used in size press solutions. To the starch solution was added a 500,000 average molecular weight poly(2-ethyl-2-oxazoline) (PEOx) which was predissolved in water. The amount of PEOx solution added to the starch was such to give 0.2% PEOx on a dry basis in the final dry paper. In two samples paper makers alum $(Al_2SO_4*14H_2O)$ was also added into the starch solution. The amount of alum listed in the table are on a basis of the amount of $Al_2SO_4*14H_2O$ to final dry paper weight that is as a percent of the final paper weight. The amount of additive, such as paper makers alum, that is added to the starch is determined by knowing how much of the wet starch solution is taken up (applied to) the paper under the conditions used.

TABLE 1

| Example | Description | Amount of aluminum salt (% wt. based on dry weight of paper) | INDIGO™ 100% Black Image Adhesion (% adhered) | INDIGO™ 290% Composite Black Image Adhesion (% adhered) |
|---|---|---|---|---|
| C1 | No binder additive and no aluminum salt | 0 | 83 | 57 |
| C2 | Binder additive but no aluminum salt | 0 | 97 | 73 |
| E1 | Binder additive and aluminum salt I | 0.05 | 99 | 75 |
| E2 | Binder additive and aluminum salt I | 0.3 | 100 | 77 |

Binder additive is poly(2-ethyl-2-oxazoline) (PEOx) having a weight average molecular weight of 500,000 which is commercially available.

Aluminum Salt I is paper makers alum ($Al_2SO_4 \cdot 14H_2O$) which is commercially available.

Addition of PEOx improved the adhesion of images (57% to 73% adhesion with the 290% composite black images, also known at the photo-black print). The addition of paper makers alum into the starch size press solution, and thus into the paper, led to a further improved adhesion of images printed with the HP® INDIGO™ press versus use of the PEOx without the addition of the alum (73% to 75% at 0.05 wt. % paper makers alum or 75% to 77% at 0.3 wt. % paper makers alum). The higher amount of alum gave more improvement than the lower amount of alum. The improvement was observed with both the 100% black ink images and with the 290% coverage composite black images, the images HP® specifies for adhesion testing.

Example 2

Exemplary and comparative printed materials were formed and evaluated utilizing the same process and conditions of Example 1 except the ethylated starch used was from ADM (Archer Daniels Midland Company). The amount of starch applied was 4% on a dry basis to dry paper. The amount of hexafunctional OBA was 0.75%. The amount of PEOx applied was 0.3%. Papermakers alum was again used as the aluminum salt for enhancing adhesion. The basesheet was again a fine paper suitable for offset or LEP printing. It was made on a commercial paper machine but was not size press treated on the paper machine. Again it was treated for testing purposes using a Dixon coater with a puddle size press type set-up. The basesheet was sized with alkyl ketene dimer rather than alkyl succinic anhydride. It again contained PCC filler. The Gurley porosity was higher than that of the paper in Example 1. A higher Gurley porosity (more closed paper structure) can lead to more of the size press treatment being at the surface of the paper. The image adhesion results are shown in Table 2.

TABLE 2

| Example | Description | Amount of aluminum salt (% wt. based on dry weight of paper) | INDIGO™ 100% Black Image Adhesion (% adhered) | INDIGO™ 290% Composite Black Image Adhesion (% adhered) |
|---|---|---|---|---|
| C3 | No binder additive and no aluminum salt | 0 | 87 | 58 |
| C4 | Binder additive but no aluminum salt | 0 | 100 | 88 |
| E3 | Binder additive and aluminum salt I | 0.3 | 100 | 99 |
| E4 | Binder additive and aluminum salt I | 0.6 | 91 | 76 |

Binder additive is poly(2-ethyl-2-oxazoline) (PEOx) having a weight average molecular weight of 500,000 which is commercially available.

Aluminum Salt I is paper makers alum ($Al_2SO_4 \cdot 14H_2O$) which is commercially available.

Addition of PEOx was again shown to be beneficial to the adhesion of images printed with an INDIGO™ press. Addition of 0.3% alum to the final paper significantly improved the adhesion of the 290% coverage images. However, addition of too much alum had a negative effect. For some basesheets, such as in this example, the level of aluminum sulfate addition may be limited. In general, no such limitation is observed except in that the amount of aluminum sulfate or other aluminum salt may affect the composition to the point that it cannot be applied uniformly to a substrate or the composition itself is not uniform.

Example 3

Exemplary and comparative printed materials were formed and evaluated utilizing the same process and conditions of Example 1 except ETHYLEX® 2015 starch from Tate & Lyle was used at a solids of 10% to give an amount dry starch in the final dry paper of 2.2%. Optical brightening agent, NaCl, and defoamer were not added with the starch. Starch alone, starch with the polymer additive PEOx and starch with PEOx and paper makers alum were tested. As in the above examples paper makers alum was $Al_2SO_4 \cdot 14H_2O$ and the amount added is reported on a basis of the amount of $Al_2SO_4 \cdot 14H_2O$ added to the weight of the dry paper. The amount of PEOx was 0.3% on a dry basis to dry paper. Table 3 gives the results.

TABLE 3

| Example | Description | Amount of aluminum salt (% wt. based on dry weight of paper) | INDIGO™ 100% Black Image Adhesion (% adhered) | INDIGO™ 290% Composite Black Image Adhesion (% adhered) |
|---|---|---|---|---|
| C5 | No binder additive and no aluminum salt | 0 | 82 | 62 |
| C6 | Binder additive but no aluminum salt | 0 | 92 | 76 |
| E5 | Binder additive and aluminum salt I | 0.6 | 95 | 90 |

Binder additive is poly(2-ethyl-2-oxazoline) (PEOx) having a weight average molecular weight of 500,000 which is commercially available.

Aluminum Salt I is paper makers alum ($Al_2SO_4 * 14H_2O$) which is commercially available.

The addition of the PEOx improved image adhesion and the addition of alum with the PEOx further improved the adhesion of the images. The level of alum at 0.6 wt. % was the same as in Ex. 4 of Example 2. In Example 2, the high level of alum was not helpful, but in Ex. 3 of this example, it was. For each set up conditions for the method and final paper characteristics there is an optimum level of aluminum salt.

Example 4

Processes and conditions similar to Example 1 were used again to evaluate exemplary and comparative printed materials formed from the addition of a variety of aluminum salts. As with Example 1 OBA, NaCl, and defoamer were added to the starch solution used to treat the paper. Amounts of 0.4% OBA, 0.25% NaCl, and 0.01% defoamer were in the final dry paper. For all of the experiments the level of OBA was on an as received basis. That is the level of OBA in the paper was 0.4% of the as received OBA solution to dry paper weight. The same was true of the defoamer. For all of the samples with PEOx the level of PEOx was 0.3% of a dry basis to final dry paper. Various aluminum salts were utilized. The variety of additives and the results are given in Table 4.

TABLE 4

| Example | Description | Amount of aluminum salt (% wt. based on dry weight of paper) | INDIGO ™ 100% Black Image Adhesion (% adhered) | INDIGO ™ 290% Composite Black Image Adhesion (% adhered) |
|---|---|---|---|---|
| C7 | No binder additive and no aluminum salt | 0 | 87 | 59 |
| C8 | Binder additive but no aluminum salt | 0 | 100 | 78 |
| E6 | Binder additive and aluminum salt I at pH of about 3.5 | 0.25 | 100 | 88 |
| E7 | Binder additive and aluminum salt I at pH 5.5 | 0.25 | 100 | 84 |
| E8 | Binder additive and aluminum salt II | 0.10 | 100 | 81 |
| E9 | Binder additive and aluminum salt II | 0.25 | 100 | 83 |
| E10 | Binder additive and aluminum salt III | 0.10 | 100 | 95 |
| E11 | Binder additive and aluminum salt III | 0.25 | 100 | 100 |

Binder additive is poly(2-ethyl-2-oxazoline) (PEOx) having a weight average molecular weight of 500,000 which is commercially available.

Aluminum Salt I is paper makers alum ($Al_2SO_4 * 14H_2O$) which is commercially available.

Aluminum Salt II is sodium aluminate which is commercially available.

Aluminum Salt III is polyaluminum chlorohydrate (PAC) which is commercially available from Solenis under the tradename PERFORM™ PB9007 retention aid, is a high basicity PAC of 83% basicity, and is also commonly referred to as aluminum chlorohydrate.

The addition of paper makers alum along with PEOx into the size press treatment on the Dixon coater led to an improvement of the adhesion of INDIGO™ printed images. No improvement could be detected with the 100% black ink coverage because the PEOx alone gave perfect adhesion. However, the improvement was observed easily with the 290% ink coverage image. The addition of alum improved the amount of adhesion from 78 to 88%.

Addition of alum lowers the pH of a size press starch solution. Using the same combination of PEOx and alum, but with a pH increase to 5.5 with sodium hydroxide still led to improved adhesion of the INDIGO™ printer images. The adhesion improved from 78 to 84%.

Use of sodium aluminate instead of alum as gave increased image adhesion. Addition of polyaluminum chloride (aluminum chlorohydrate) provided a large improvement of image adhesion.

Example 5

In a continuation of Example 4, the size press starch solution was changed to contain both ethylated and cationic starch, and to this mixture was added the PEOx and the alum to form exemplary and comparative printed materials. The amount of ethylated starch in the final paper remained the same and the cationic starch, which was a product called TOPCAT™ 98 from Ingredion, was added so the level in the final dry paper on a dry basis was 0.3%. The results of adding PEOx, still at 0.3% as in Example 4, and alum are shown in Table 5.

TABLE 5

| Example | Description | Amount of aluminum salt (% wt. based on dry weight of paper) | INDIGO ™ 100% Black Image Adhesion (% adhered) | INDIGO ™ 290% Composite Black Image Adhesion (% adhered) |
|---|---|---|---|---|
| C9 | No binder additive and no aluminum salt | 0 | 87 | 59 |
| C10 | Binder additive but no aluminum salt | 0 | 100 | 78 |
| E12 | Binder additive and cationic starch, but no aluminum salt | 0 | 100 | 87 |
| E13 | Binder additive cationic starch, and aluminum salt I | 0.10 | 100 | 89 |
| E14 | Binder additive, cationic starch, and aluminum salt I | 0.25 | 100 | 91 |

Binder additive is poly(2-ethyl-2-oxazoline) (PEOx) having a weight average molecular weight of 500,000 which is commercially available.

Aluminum Salt I is paper makers alum ($Al_2SO_4 * 14H_2O$) which is commercially available. Cationic Starch is a cationic starch commercially available from Ingredion under the tradename TOPCAT™ 98.

Without the cationic starch but with the PEOx the adhesion of an image of 290% ink coverage was 78%. With the cationic starch and still with the addition of PEOx that adhesion was 87%. Addition of the cationic starch, PEOx, and 0.1% and 0.25% alum in the final paper gave adhesion values of 89% and 91%, respectively.

Example 6

In a further continuation of Example 4, one half of the ethylated starch was replaced by a cationic starch (CATO® 233) and again PEOx and alum were added to form exemplary and comparative printed materials. The results are in Table 6.

TABLE 6

| Example | Binder Additive | Amount of aluminum salt compound (% wt. based on dry weight of paper) | INDIGO™ 100% Black Image Adhesion (% adhered) | INDIGO™ 290% Composite Black Image Adhesion (% adhered) |
|---|---|---|---|---|
| C11 | No binder additive and no aluminum salt | 0 | 87 | 61 |
| C12 | Binder additive but no aluminum salt | 0 | 100 | 78 |
| E15 | Binder additive and aluminum salt I | 0.25 | 100 | 85 |

Binder additive is poly(2-ethyl-2-oxazoline) (PEOx) having a weight average molecular weight of 500,000 which is commercially available.
Aluminum Salt I is paper makers alum ($Al_2SO_4 \cdot 14H_2O$) which is commercially available.

The starch mixture without the PEOx or alum led to 290% image adhesion of 61%. Addition of the PEOx, again at 0.3% dry basis, led to 78% adhesion and the further addition of alum led to 85% adhesion.

Example 7

Another experiment was run to form in exemplary and comparative printed materials similar to that of Example 4 with the same base paper treated on a Dixon coater in puddle size press mode with ethylated starch, OBA, NaCl, and defoamer at the same levels as in Example 4. Again the level of PEOx added to the starch was such to get 0.3% in the paper on a dry basis. Various aluminum salts and related compounds were used with the PEOx, the materials were added to the starch solution containing the PEOx. Table 7 provides the results of the adhesion test of the black and composite black (290%) printed areas of the final paper.

TABLE 7

| Example | Binder Additive | Amount of aluminum salt compound (% wt. based on dry weight of paper) | INDIGO™ 100% Black Image Adhesion (% adhered) | INDIGO™ 290% Composite Black Image Adhesion (% adhered) |
|---|---|---|---|---|
| C13 | No binder additive and no aluminum salt | 0 | 86 | 65 |
| C14 | Binder additive but no aluminum salt | 0 | 100 | 84 |
| C15 | No binder additive, but including aluminum salt III | 0.20 | 88 | 65 |
| E16 | Binder additive and aluminum salt III at pH 5.1 | 0.05 | 100 | 86 |
| E17 | Binder additive and aluminum salt III at pH 4.7 | 0.10 | 100 | 93 |
| E18 | Binder additive and aluminum salt III at pH 4.2 | 0.20 | 100 | 99 |
| E19 | Binder additive and aluminum salt III at pH 5.5 | 0.10 | 100 | 85 |
| E20 | Binder additive and aluminum salt IV | 0.10 | 100 | 84 |
| E21 | Binder additive and aluminum salt V | 0.10 | 100 | 81 |
| E22 | Binder additive and additive I | 0.1 | 100 | 77 |
| E23 | Binder additive and additive II | 0.1 | 100 | 75 |
| E24 | Binder additive and additive III | 0.1 | 100 | 78 |
| E25 | Binder additive and aluminum salt III premixed | 0.15 | 100 | 75 |

Binder additive is poly(2-ethyl-2-oxazoline) (PEOx) having a weight average molecular weight of 500,000 which is commercially available.
Aluminum Salt III is polyaluminum chlorohydrate (PAC) which is commercially available from Solenis under the tradename PERFORM™ PB9007 retention aid, has a basicity of 83% basicity, and is also commonly referred to as aluminum chlorohydrate.
Aluminum Salt IV is polyaluminum chlorohydrate (PAC) which is commercially available from Aluminum Chemical Specialties under the tradename ACS 2030 has a basicity of 30% basicity, and is also commonly referred to as aluminum chlorohydrate.
Aluminum Salt V is polyaluminum chlorohydrate (PAC) which is commercially available from GEO® Specialty Chemicals under the tradename ULTRAPAC® 1692 has a basicity of 20% basicity, and is also commonly referred to as aluminum chlorohydrate.
Additive I is ammonium zirconium carbonate which is commercially available.
Additive II is Borax which is commercially available.
Additive III is zinc chloride which is commercially available.

Most of the differences were observed with the 290% ink coverage images. It was observed again that the adding PEOx with the starch gave improved adhesion—84% versus 65%. Adding PAC (PERFORM™ PB9007 from Solenis with 83% basicity), labeled PAC #1, gave 86, 93, and 99% adhesion for levels of dry PAC in the final dry paper of 0.05, 0.1, and 0.2%, respectively. However, addition of the PAC at 0.2% without the presence of the PEOx gave no improvement on the 290% image adhesion.

PAC, as does alum, will lower the pH of a starch solution. When 0.1% PAC (final paper dry %) was used with PEOx and the starch solution pH was increased to 5.5 with sodium hydroxide, there was only a very slight improvement of the adhesion over the use of just PEOx. Two other PAC chemistries were tested: ACS 2030 from Aluminum Chemical Specialties with 30% basicity (Aluminum Salt IV) and ULTRAPAC® 1692 with 20% basicity (Aluminum Salt V). The PAC having the higher basicity of 83% (Aluminum Salt III) provided improved adhesion under the conditions of the current test. The addition of ammonium zirconium carbonate (AZC), a known starch crosslinker, did not improve the adhesion of the INDIGO™ printer images. Nor did the addition of Borax or zinc chloride, under the conditions of the experiment, provide enhanced adhesion of images. Also premixing the PEOx with the first PAC tested, led to a lack of improvement of the image adhesion. That is, there was a limitation on formulation of the patent composition where when the polymer binder additive was PEOx and the aluminum salt was PERFORM™ PB9007 polyaluminum chlorohydrate, the addition of the PERFORM™ PB9007 and the PEOx was not as good as the addition of the PEOx alum. As noted in the body of the patent, it is best to add the polymer binder additive and the aluminum salt separately to the binder because the binder dilutes the concentrations of the components and reduces the possibility of interactions between the pure polymer binder additive and the aluminum salt.

Example 8

In a continuation of Example 7, the ethylated starch was replaced completely by either oxidized starch or cationic starch in exemplary and comparative printed materials. The oxidized starch was D28F from Grain Processing Corp. and the cationic starch was CATOSIZE® 240. Table 8 shows the effects of PEOx and PAC (PERFORM™ PB9007) when different starches were used.

TABLE 8

| Example | Binder Additive | Amount of salt compound (% wt. based on dry weight of paper) | INDIGO™ 100% Black Image Adhesion (% adhered) | INDIGO™ 290% Composite Black Image Adhesion (% adhered) |
|---|---|---|---|---|
| | | Oxidized Starch | | |
| C17 | Binder additive but no aluminum salt | 0 | 100 | 82 |
| E26 | Binder additive and aluminum salt III | 0.10 | 100 | 91 |
| | | Cationic Starch | | |
| C18 | Binder additive but no aluminum salt | 0 | 100 | 81 |

TABLE 8-continued

| Example | Binder Additive | Amount of salt compound (% wt. based on dry weight of paper) | INDIGO™ 100% Black Image Adhesion (% adhered) | INDIGO™ 290% Composite Black Image Adhesion (% adhered) |
|---|---|---|---|---|
| E27 | Binder additive and aluminum salt III | 0.10 | 100 | 98 |

Binder additive is poly(2-ethyl-2-oxazoline) (PEOx) having a weight average molecular weight of 500,000 which is commercially available.
Aluminum Salt III is polyaluminum chlorohydrate (PAC) which is commercially available from Solenis under the tradename PERFORM™ PB9007 retention aid, has a basicity of 83% basicity, and is also commonly referred to as aluminum chlorohydrate.

With the oxidized starch adding both PEOx and PAC improved adhesion from 82% with just the starch to 91%. The level of PEOx and PAC in the dry paper being 0.3 and 0.1%, respectively. With the use of the CATOSIZE® 240 starch the starch alone gave the paper and adhesion level of 290% ink images of 81%. The addition of the 0.3 and 0.1% PEOx and PAC, respectively, led to 98% adhesion.

Example 9

Exemplary and comparative printed materials were evaluated for effectiveness of the binder additive based on various base sheets varying by Gurley porosity and the need for addition of an aluminum salt. Gurley porosity is a standard paper industry method for measuring the porosity of paper. The higher the value the more closed the sheet structure. Different types of paper were treated using a Dixon coater. The treatments combined ethylated starch and PEOx with the ethylated starch addition level being about 3.5% of the paper on a dry weight basis. Both sides of the paper samples were treated with a puddle size press type configuration. The base sheets were not previously treated with a size press when manufactured. The following table lists the porosity of the base sheet, the level of PEOx added, on a dry basis to dry paper weight, and the addition of aluminum salt. The table also lists the results of adhesion testing of images printer with an HP INDIGO™ printer. The values are for 290% photo black images.

TABLE 9

| Base Sheet | Base Sheet Gurley Porosity | Amount of binder additive added (wt. %) | Amount of aluminum salt III added (wt. %) | INDIGO™ 290% Composite Black Image Adhesion (% adhered) |
|---|---|---|---|---|
| C19 | 33 | 0 | 0 | 57 |
| E28 | 33 | 0.1 | 0 | 96 |
| E29 | 33 | 0.2 | 0 | 98 |
| E30 | 33 | 0.4 | 0 | 99 |
| C20 | 14 | 0 | 0 | 65 |
| E31 | 14 | 0.3 | 0 | 84 |
| E32 | 14 | 0.3 | 0.1 | 93 |

Binder additive is poly(2-ethyl-2-oxazoline) (PEOx) having a weight average molecular weight of 500,000 which is commercially available.
Aluminum Salt III is polyaluminum chlorohydrate (PAC) which is commercially available from Solenis under the tradename PERFORM™ PB9007 retention aid, has a basicity of 83% basicity, and is also commonly referred to as aluminum chlorohydrate.

The effectiveness of (PEOx) to increase image adhesion from a liquid toner was for a base sheet having a Gurley porosity of 14 was less than a base sheet having a Gurley porosity of 33. Therefore, to reach higher levels of image adhesion, such as greater than 90% with 290% photo black images, base sheet having lower Gurley porosity require additional poly aluminum chloride as part of the starch treatment.

Any of the above-described embodiments can be used during either the formation or treatment of the substrate, including treatment just prior to printing using liquid toner on the substrate using an LEP printer. For example, the binder additive and aluminum salt may be applied by a coating station on the printer or even printed onto the surface. In various embodiments, the present disclosure is directed to a composition, to a method of making a LEP printable substrate, to a printable substrate, to a printed substrate exhibiting improved adhesion of LEP printed images produced by any one of the above-recited methods. In other embodiments, the present disclosure is directed to a printed substrate produced by any one of the above-recited LEP methods, which may further include one or more images printed on the substrate before and/or after the above-recited LEP methods. In one embodiment, the one or more additional images printed on the substrate can be printed using any printing method/process as would be known to a person of ordinary skill in the art, including, for example but without limitation, inkjet printing.

While at least one exemplary embodiment has been presented in the foregoing detailed description of the disclosure, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the disclosure as set forth in the appended claims.

What is claimed is:

1. A method for improving adhesion of an image to a treated substrate, the method comprising:
    providing a substrate;
    applying a water-based composition to the substrate to form a treated substrate, the composition comprising; binder,
    a binder additive comprising a polymer, the polymer comprising at least one repeating unit, and the at least one repeating unit comprising a tertiary amide group, and
    an aluminum salt; and
    applying a liquid toner to the treated substrate to form the image on the treated substrate,
    wherein the composition comprises the binder additive and the aluminum salt in a weight ratio of from about 4:1 to about 1:2.

2. The method of claim 1, wherein the repeating unit of the polymer is formed from a monomer selected from the group consisting of vinylpyrrolidone, an oxazoline-containing monomer, N-vinyl piperidinone, N-vinylcaprolactam, N,N-dimethyl acrylamide, and combinations thereof.

3. The method of claim 1, wherein the liquid toner is applied to the treated substrate utilizing liquid electrophotographic printing.

4. A printed material exhibiting improved adhesion of an image to a treated substrate, comprising:
    a treated substrate, comprising;
    a substrate, and
    a coating disposed on the substrate and formed from a water-based composition comprising a binder, a binder additive, and an aluminum salt wherein the binder additive comprises a polymer, the polymer comprises at least one repeating unit, and the at least one repeating unit comprises a tertiary amide group; and
    an image disposed on the treated substrate and formed from a liquid toner,
    wherein the treated substrate has a first side and a second side opposite the first side, and wherein each of the first side and the second side, independently, comprise:
    the binder additive in an amount of from about 0.0075 to about 0.375 g/m² based on a total weight of the substrate on a dry weight basis;
    the aluminum salt in an amount of from about 0.0075 to about 0.375 g/m² based on a total weight of the substrate on a dry weight basis; or
    a combination thereof.

5. A method for improving adhesion of an image to a treated substrate, the method comprising:
    providing a substrate;
    applying a water-based composition to the substrate to form a treated substrate, the composition comprising; binder,
    a binder additive comprising a polymer, the polymer comprising at least one repeating unit, and the at least one repeating unit comprising a tertiary amide group, and
    an aluminum salt; and
    applying a liquid toner to the treated substrate to form the image on the treated substrate,
    wherein the treated substrate has a first side and a second side opposite the first side, and wherein each of the first side and the second side, independently, comprise:
    the binder additive in an amount of from about 0.0075 to about 0.375 g/m² based on a total weight of the substrate on a dry weight basis;
    the aluminum salt in an amount of from about 0.0075 to about 0.375 g/m² based on a total weight of the substrate on a dry weight basis; or
    a combination thereof.

6. The method of claim 5, wherein the repeating unit of the polymer is formed from a monomer selected from the group consisting of vinylpyrrolidone, an oxazoline-containing monomer, N-vinyl piperidinone, N-vinylcaprolactam, N,N-dimethyl acrylamide, and combinations thereof.

7. The method of claim 5, wherein the repeating unit of the polymer is formed from a monomer selected from the group consisting of 2-ethyl-2-oxazoline, 2-methyl-2-oxazoline, and a combination thereof.

8. The method of claim 5, wherein the polymer is a homopolymer.

9. The method of claim 5, wherein the aluminum salt comprises aluminum sulfate, polyaluminum chlorohydrate, aluminum chlorohydrate, sodium aluminate, or combinations thereof.

10. The method of claim 5, wherein the aluminum salt comprises aluminum chlorohydrate.

11. The method of claim 5, wherein the binder comprises a polyvinyl alcohol, a starch, a gelatin, a casein, a protein, a carboxy-methyl cellulose, a hydroxyethyl cellulose, an acrylic emulsion, a vinyl acetate emulsion, a vinylidene chloride emulsion, a polyester emulsion, a styrene-butadiene emulsion, an acrylonitrile-butadiene latex, or combinations thereof.

12. The method of claim 5, wherein the binder comprises a water-soluble hydroxyl-functional polymer.

13. The method of claim 12, wherein the binder comprises a starch and the starch is selected from the group consisting of an oxidized starch, a cationized starch, an ethylated starch, an esterified starch, an enzymatically denatured starch, and combinations thereof.

14. The method of claim 5, wherein the substrate is selected from the group consisting of a paper product, a woven fibrous material, a non-woven fibrous material, and combinations thereof.

15. The method of claim 14, wherein the substrate is a paper product and the paper product is uncoated.

16. The method of claim 5, wherein the liquid toner is applied to the treated substrate utilizing liquid electrophotographic printing.

17. The method of claim 5, wherein the composition is applied to the substrate utilizing a size press of a paper machine.

18. A method for improving adhesion of an image to a treated substrate, the method comprising:
   providing a paper product;
   applying a water-based composition to the paper product to form a treated paper product, the composition comprising;
   binder,
   a binder additive comprising a polymer, the polymer comprising at least one repeating unit, and the at least one repeating unit comprising a tertiary amide group, and
   an aluminum salt; and
   applying a liquid toner to the treated paper product to form the image on the treated paper product,
   wherein:
   the binder additive is applied to the paper product in an amount of from about 0.02 to about 1 wt. % based on a total weight of the paper product on a dry weight basis;
   the aluminum salt is applied to the paper product in an amount of from about 0.02 to about 1 wt. % based on a total weight of the paper product on a dry weight basis; or
   a combination thereof.

* * * * *